United States Patent
Otto et al.

(10) Patent No.: US 9,963,065 B2
(45) Date of Patent: May 8, 2018

(54) ZERO TURN MOWER LIGHT SYSTEM

(71) Applicant: Deere & Company, Moline, IL (US)

(72) Inventors: Jordan D. Otto, Horicon, WI (US); Amber Resch, Horicon, WI (US); Eric M. Forbes, Oconomowoc, WI (US); Kyle T. Ressler, West Bend, WI (US)

(73) Assignee: Deere & Company, Moline, IL (US)

( * ) Notice: Subject to any disclaimer, the term of this patent is extended or adjusted under 35 U.S.C. 154(b) by 337 days.

(21) Appl. No.: 14/833,488

(22) Filed: Aug. 24, 2015

(65) Prior Publication Data
US 2017/0057408 A1    Mar. 2, 2017

(51) Int. Cl.
| B60Q 1/124 | (2006.01) |
| B60Q 1/24 | (2006.01) |
| B60Q 1/00 | (2006.01) |
| B60Q 3/283 | (2017.01) |

(52) U.S. Cl.
CPC ............. B60Q 1/24 (2013.01); B60Q 1/0094 (2013.01); B60Q 3/283 (2017.02)

(58) Field of Classification Search
CPC ......... B60Q 1/24; B60Q 1/0094; B60Q 3/283
See application file for complete search history.

(56) References Cited

U.S. PATENT DOCUMENTS

| 6,695,090 B2 | 2/2004 | McAllister |
| 6,821,006 B2 | 11/2004 | Shikiya |
| 8,646,952 B2 | 2/2014 | Walden et al. |
| 2008/0190085 A1* | 8/2008 | Hoffman ................ A01D 34/69 56/14.7 |
| 2012/0113633 A1 | 5/2012 | Bowen |
| 2013/0141933 A1* | 6/2013 | Leonardo ................... B62J 6/02 362/523 |
| 2014/0262560 A1* | 9/2014 | Dwyer .................. A01D 34/82 180/6.48 |

OTHER PUBLICATIONS

"ROPS Lights LED Worklight Kits for Zero-Turn Mowers." ROPS Lights. Product webpage [online] [retrieved Jul. 14, 2015]. Retrieved from the Internet: <http://ropslights.com/?page_id=225>.
"Compare ROPS Lights to Other Lighting Systems." ROPS Lights. Product webpage [online] [retrieved Jul. 14, 2015]. Retrieved from the Internet: <http://ropslights.com/?page_id=191>.
"Light kit (ROPS)—Zero Turn Mower Accessories." Husqvarna, 2013. Product webpage [online] [retrieved Jul. 15, 2015]. Retrieved from the Internet: <http://www.husqvarna.com/us/accessories/zero-turn-mower-accessories/light-kit-rops/>.
"3696 Zero-Turn Mower." Lastec, 2010. Product webpage [online] [retrieved Jul. 15, 2015]. Retrieved from the Internet: <http://www.lastec.com/lastec/zeroturn/3696.aspx>.

(Continued)

*Primary Examiner* — Anh Mai
*Assistant Examiner* — Nathaniel Lee

(57) ABSTRACT

A zero turn mower light system includes a pair of light assemblies, each light assembly mounted to a motion control lever. Each light assembly moves fore and aft with a motion control lever during a ZTR mower turn such that one light assembly directs a light beam into the direction of a ZTR mower turn before the other light assembly. Each light assembly may include a light housing and a mounting pad between the light housing and the motion control lever.

10 Claims, 3 Drawing Sheets

(56) References Cited

OTHER PUBLICATIONS

"107-9131, Light Kit, Zero-Turn-Radius Riding Mower." Mower Parts Direct, 2015. Parts catalogue [online] [retrieved Jul. 14, 2015]. Retrieved from the Internet: <http://www.mowerpartsdirect.us/pp./OemParts>.

"Lawn Mower Light Kits." Mowers Direct, 2015. Product catalogue [online] [retrieved Jul. 14, 2015]. Retrieved from the Internet: <http://www.mowersdirect.com/lawn/lawn-mower-light-kits.html>.

"TimeCutter® ZX." Toro, 2015. Product webpage [online] [retrieved Jul. 14, 2015]. Retrieved from the Internet: <http://www.toro.com/home/zeroturn/timecutterzx/attach_lightkit.html>.

\* cited by examiner

ZERO TURN MOWER LIGHT SYSTEM

FIELD OF THE INVENTION

This invention relates generally to grass mowing machines, and specifically to light systems for zero turn mowers.

BACKGROUND OF THE INVENTION

Grass mowing machines known as zero turning radius ("ZTR") mowers have at least one independently powered rear drive wheel on each side of a frame. Many ZTR mowers have a twin stick control system. A pair of motion control levers or sticks may be provided side-by-side, with each lever or stick controlling one of the rear drive wheels. When both levers or sticks are advanced together forwardly out of their neutral position, both rear drive wheels rotate forwardly to cause the ZTR mower to move forward. A ZTR mower may be steered by advancing one lever or stick more than the other.

Typically, each motion control lever or stick on a ZTR mower may be linked to a pump arm of one of two separate hydraulic pumps, or of a dual hydraulic pump; i.e., a separate pump for each rear drive wheel. The lever or stick may be used to move a pump swash plate through a direct linkage.

Light systems have been offered for installation on ZTR mowers for use in twilight or dark conditions. Typically, one or more headlights may be mounted on the ZTR mower at a fixed location such as the foot platform in front of the operator, next to the operator seat, or on the ROPS over the operator seat. At these mounting positions, the lights may be damaged if the ZTR mower brushes against tree limbs, fences or other objects. Additionally, ZTR mower light systems that are mounted in front of the operator may not provide good peripheral lighting, and light systems mounted on the ROPS may not provide good lighting in front of the ZTR mower. Additionally, ZTR mower light systems are bulky, can be relatively expensive, and difficult to install as kits.

A zero turn mower light system is needed that will not be exposed to damage from nearby objects during mowing. A zero turn mower light system is needed that provides good lighting on each side and to the front of a ZTR mower. A zero turn mower light system is needed that is lower cost than conventional ZTR light systems, is not bulky, and is relatively easy to install as a kit.

SUMMARY OF THE INVENTION

A zero turn mower light system includes a pair of light assemblies mounted to a pair of motion control levers at positions between a grip and a base of each motion control lever. Each light assembly pivots with the motion control lever during turns independently of the other light assembly. Each light assembly may have a light housing, a mounting pad, and a wiring harness extending from each light housing through the mounting pad and down the motion control lever to an electrical system.

By positioning the zero turn mower light system on the motion control levers, it is better protected from nearby objects during mowing. The zero turn light system moves as the operator steers, and provides good lighting on each side and to the front of a ZTR mower. The zero turn mower light system also is lower cost than conventional ZTR light systems, is less bulky, and is easier to install as a kit.

DESCRIPTION OF THE PREFERRED EMBODIMENT

Figure 1:
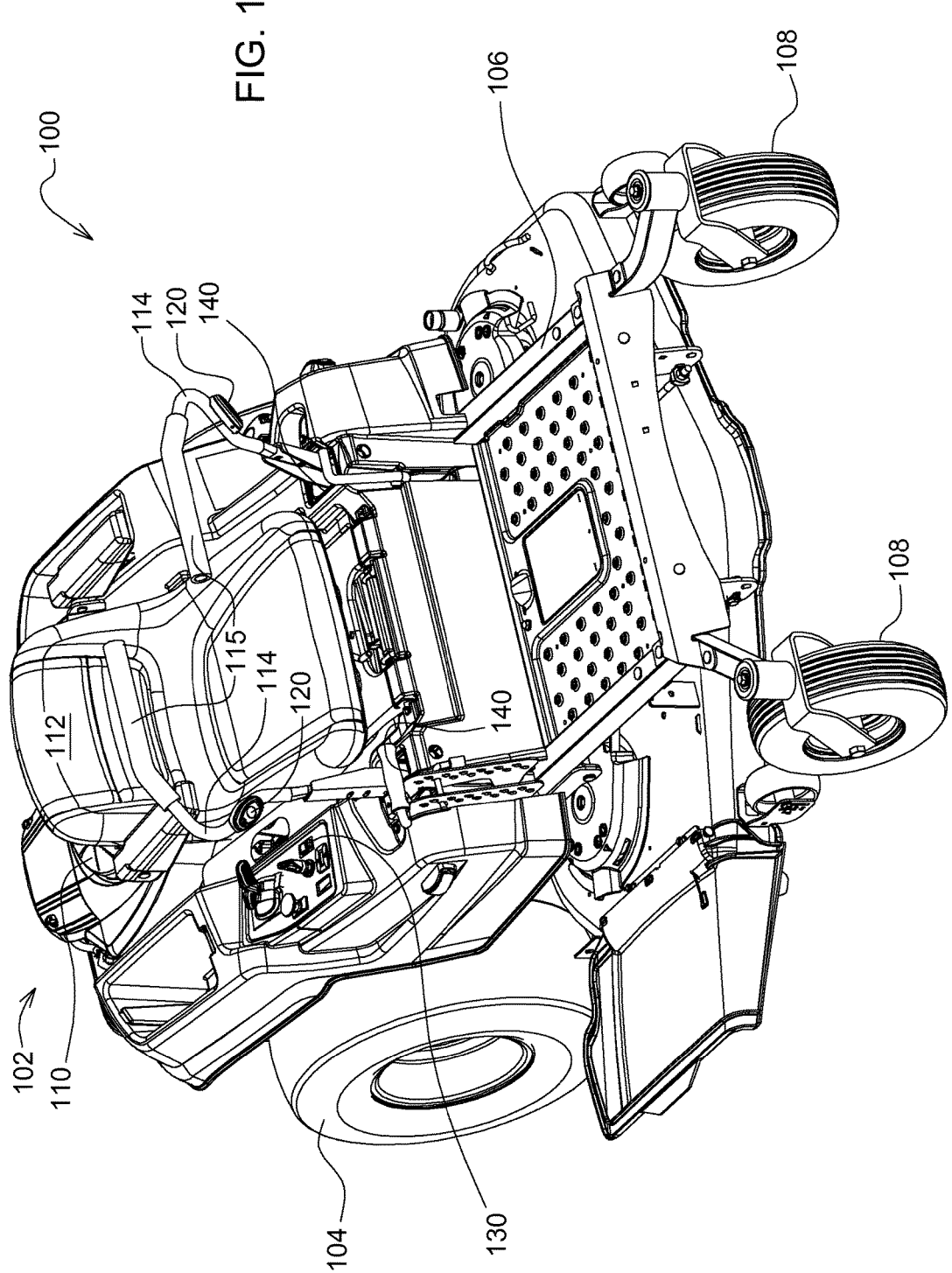
FIG. 1 is a front perspective view of a ZTR mower with a light system according to one embodiment of the invention.
Figure 2:
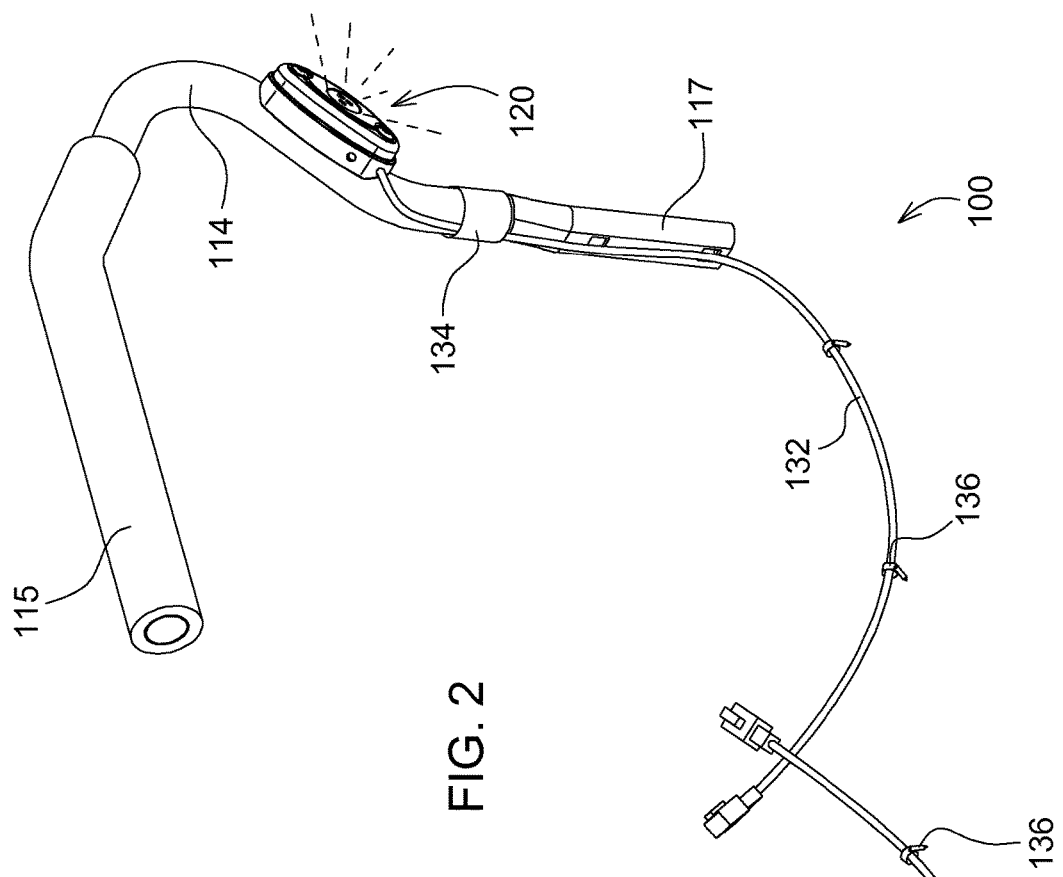
FIG. 2 is a perspective view of a zero turn mower light system according to one embodiment of the invention.
Figure 3:
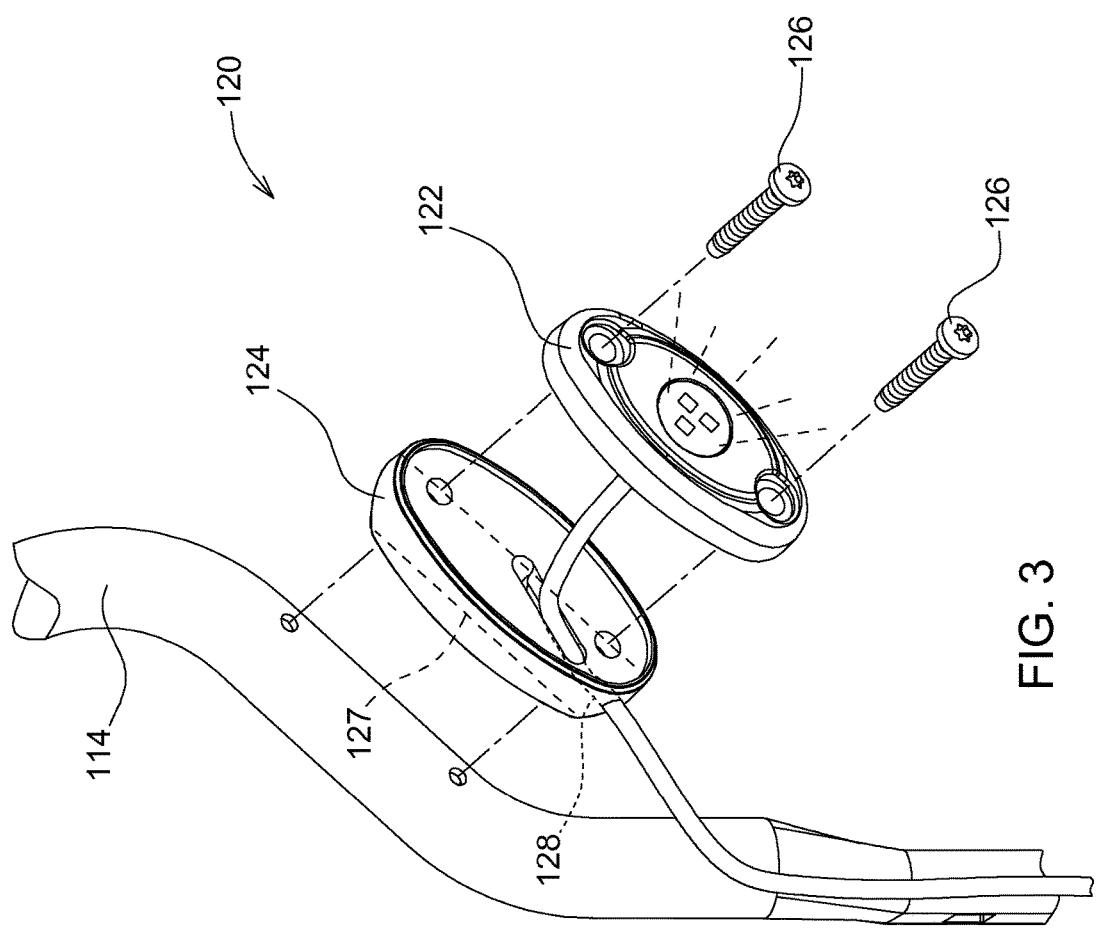
FIG. 3 is an exploded perspective view of a light assembly that is part of the zero turn mower light system according to one embodiment of the invention.

FIGS. 1-3 show one embodiment of zero turn mower light system 100 on ZTR mower 102 having a pair of rear drive wheels 104 that are independently powered so that each rear drive wheel rotates independently of the other rear drive wheel. Each independent drive may include an integrated hydrostatic pump and motor unit coupled to one of the rear drive wheels. Each hydrostatic pump may have a swash plate that may define a pump stroke between a full forward position, a neutral position, and a reverse position. The ZTR mower may have a frame 106 supported on a forward end by front wheels 108, and a rear mounted engine 110 behind operator seat 112. The seat may be mounted over the frame for a seated operator to use left and right motion control levers or sticks 114.

In one embodiment, the left and right motion control levers or sticks 114 are mounted on the ZTR mower and are pivotable between forward, neutral and reverse positions. Each motion control lever or stick may be mounted to the ZTR mower so that the lever may pivot forwardly to move a swash plate in the hydrostatic pump in a first direction to cause a rear drive wheel to rotate forward, or pivot rearwardly to move the swash plate in a second direction to cause the rear drive wheel to rotate backward. Each motion control lever or stick may have a neutral position in which the corresponding rear drive wheel is at rest. Each motion control lever or stick may extend through an opening 140 adjacent or in front of the operator's seat on a ZTR mower, where the base 117 of each motion control lever or stick may connect to the hydrostatic drive system of the ZTR mower.

In one embodiment, zero turn mower light system 100 may include a pair of light assemblies 120. One light assembly 120 may be mounted to each motion control lever 114. The light assembly moves fore and aft when the operator pivots the motion control lever, independent of the other light assembly and motion control lever. More specifically, each light assembly pivots along with the motion control lever to which it is attached. Mounting a light assembly onto a pivoting motion control lever, instead of a fixed location, is useful when the ZTR mower is turning. During a ZTR mower turn, the operator may pivot one motion control lever ahead of the other motion control lever. As a result, one light assembly may direct its light beam into the direction of the turn before the other light assembly.

In one embodiment, each light assembly 120 may be mounted onto a motion control lever at a position between the grip 115 and the base 117 of the motion control lever. The base of each motion control lever may be near the pivot point where the lever connects to the hydrostatic drive system. Each light assembly may be secured to the motion control lever with threaded fasteners 126 through holes in the light assembly and lever.

In one embodiment, each light assembly 120 may include light housing 122 and mounting pad 124. For example, each light housing 122 may be an A-series LED light offered for sale by Rigid Industries. Mounting pad 124 may be dimensioned to fit snugly and provide cushioning between light housing 122 and motion control lever 114. For example, each mounting pad 124 may be a rubber body having a curved surface 127 dimensioned to fit partially around a tubular motion control lever. Each mounting pad 124 also may include a channel 128 for routing wiring harness 132 from the underside of the light housing, through the mounting pad, and out to the motion control lever.

In one embodiment, zero turn mower light system 100 may include wiring harnesses 132 connected to and extending from each light assembly 120, through channel 128 in mounting pad 124, and down along each motion control lever 114 to the electrical system of the ZTR mower. The wiring harness may be secured to a motion control lever with a sleeve 134 and one or more clips 136. Alternatively, the wiring harnesses may extend from the light assembly down through the inside of each motion control lever to the ZTR mower electrical system. The wiring harnesses may extend from the base of the motion control levers thorough slots or openings 140 adjacent the front and/or sides of the operator seat, where the wiring harnesses may connect to the ZTR mower electrical system. The zero turn mower light system may be operated by light switch 130 mounted in or adjacent the ZTR mower's operator station.

Alternative embodiments include ZTR mower light systems having light assemblies mounted using adhesives to the motion control levers, light assemblies with integral power sources, and light assemblies with integral switches.

Having described a preferred embodiment, it will become apparent that various modifications can be made without departing from the scope of the invention as defined in the accompanying claims.

The invention claimed is:

1. A zero turn mower light system, comprising:
 a first motion control lever and a second motion control lever, each lever linked to a hydrostatic transmission that rotates a rear drive wheel at a velocity corresponding to the fore and aft position of the lever; and
 a pair of light assemblies, each light assembly mounted to one of the motion control levers, each light assembly moving fore and aft with the motion control lever independent of the other light assembly and motion control lever, whereby the first motion control lever may be pivoted ahead of the second motion control lever to direct a light beam from the light assembly on the first motion control lever toward the direction of a turn before a light beam from the light assembly on the second motion control lever.

2. The zero turn mower light system of claim 1, wherein each light assembly includes a light housing and a mounting pad that provides cushioning between the light housing and the motion control lever.

3. The zero turn mower light system of claim 2, wherein each mounting pad has a curved surface dimensioned to fit partially around a tubular motion control lever.

4. A zero turn mower light system, comprising:
 a pair of light assemblies, each light assembly attached to a motion control lever and moving fore and aft with the motion control lever during a ZTR mower turn such that one light assembly directs a light beam into the direction of a ZTR mower turn before the other light assembly;
 each light assembly including a light housing and a mounting pad between the light housing and the motion control lever.

5. The zero turn mower light system of claim 4, wherein each light assembly pivots along with the motion control lever to which it is attached, independently of the other light assembly.

6. The zero turn mower light system of claim 4, wherein each mounting pad is a rubber body having a curved surface fitting snugly onto a tubular motion control lever.

7. The zero turn mower light system of claim 4, further comprising a wiring harness connecting from each light assembly down the motion control lever and through an opening adjacent the front of the operator seat to an electrical system of the ZTR mower.

8. A zero turn mower light system, comprising:
 a pair of light assemblies mounted to a pair of motion control levers at positions between a grip and a base of each motion control lever;
 each light assembly pivoting with the motion control lever during turns of a zero turn mower independently of the other light assembly whereby one light assembly directs a light beam into each turn before the other light assembly;
 each light assembly having a light housing, a mounting pad, and a wiring harness extending from each light housing through the mounting pad and down the motion control lever to an electrical system.

9. The zero turn mower light system of claim 8, wherein the mounting pad is cushioned.

10. The zero turn mower light system of claim 8, wherein the electrical system includes a light switch in an operator station.

* * * * *